US007075667B1

(12) United States Patent
Bonikowski et al.

(10) Patent No.: US 7,075,667 B1
(45) Date of Patent: Jul. 11, 2006

(54) USE OF JOB INTERRUPT FUNCTIONALITY FOR THE PRODUCTION OF INTERRUPTING AND SAMPLE JOB OUTPUT IN DIGITAL PRINTING SYSTEMS

(75) Inventors: Gregg A. Bonikowski, Rochester, NY (US); Patrick T. Igoe, Grand Island, NY (US); Michael P. Kirby, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,321

(22) Filed: Nov. 24, 1999

(51) Int. Cl.
H04N 1/40 (2006.01)

(52) U.S. Cl. ..................... 358/1.14; 358/453

(58) Field of Classification Search ............. 358/1.14, 358/453, 1.2, 1.9; 399/43
See application file for complete search history.

(56) References Cited

U.S. PATENT DOCUMENTS

| | | | |
|---|---|---|---|
| 3,936,180 A * | 2/1976 | Willard et al. ................ 399/10 |
| 4,480,545 A | 11/1984 | Fujisawa et al. |
| 5,164,842 A * | 11/1992 | Gauronski et al. .......... 358/401 |
| 5,206,735 A * | 4/1993 | Gauronski et al. .......... 358/296 |
| 5,245,368 A * | 9/1993 | Farrell et al. ................ 358/401 |
| 5,289,768 A | 3/1994 | Keller |
| 5,488,223 A * | 1/1996 | Austin et al. ................ 235/375 |
| 5,553,216 A | 9/1996 | Yoshioka et al. |
| 5,555,803 A | 9/1996 | Holm |
| 5,559,606 A | 9/1996 | Webster et al. |
| 5,604,600 A | 2/1997 | Webster |
| 5,606,395 A | 2/1997 | Yang |
| 5,617,215 A | 4/1997 | Webster et al. |
| 5,631,740 A | 5/1997 | Webster et al. |
| 5,638,752 A | 6/1997 | Hartung et al. |
| 5,646,740 A | 7/1997 | Webster et al. |
| 5,682,247 A | 10/1997 | Webster et al. |
| 5,701,557 A | 12/1997 | Webster et al. |
| 5,710,635 A | 1/1998 | Webster et al. |
| 5,832,301 A * | 11/1998 | Yamaguchi .................. 710/48 |
| 5,970,223 A * | 10/1999 | Debes et al. ............... 358/1.16 |
| 6,011,940 A * | 1/2000 | Van Lydegraf ............. 399/87 |

* cited by examiner

Primary Examiner—Thomas D. Lee
Assistant Examiner—Stephen Brinich
(74) Attorney, Agent, or Firm—Fay, Sharpe, Fagan, Minnich & McKee, LLP

(57) ABSTRACT

Main job production progress is monitored so that sample copies of parts of the main job that are designated critical or representative of the job as a whole can be produced on a regular interrupting basis. The samples are used to monitor production quality. Digital printing system modules are arranged and configured to provide a sample job destination separate from the main job destination.

10 Claims, 5 Drawing Sheets

USE OF JOB INTERRUPT FUNCTIONALITY FOR THE PRODUCTION OF INTERRUPTING AND SAMPLE JOB OUTPUT IN DIGITAL PRINTING SYSTEMS

FIELD OF THE PRESENT INVENTION

The invention relates to the art of digital printing. It finds specific application as part of a digital production printing system.

BACKGROUND OF THE PRESENT INVENTION

During the printing of long jobs, especially those with color critical output, it is often desirable to view sample copies. Viewing samples allows the press operator to ensure that the appropriate content is being printed and that the appearance of the output matches the customers expectations. When offset presses are used, examining a sample is fairly straightforward. Copies of just one page are being produced at any one time and there are access points in the printing press that allow sheets to be viewed, and in some cases retrieved, during the printing process.

An offset printing press might, for example, have five print units. Each print unit applies one color in a multi-color printing operation. The press is usually open and the quality of the print job can be monitored by looking at the output of each print unit as it is conveyed from one print unit to the next. Adjustments to the print units can be made as the job runs.

In digital production printing, multi-page documents are being produced and delivered via closed paper paths to finishing devices that do not allow convenient access to printed output until the printing process is complete. As a result, it is extremely difficult to monitor product quality during a digital production printing job. If a problem develops in the middle of a job it is not noticed until after the job is complete. In large jobs, this can be very costly, both in wasted time and material.

Some attempts have been made to give digital printing systems more of the on-the-fly adjustability that is common in offset presses. U.S. Pat. No. 5,606,395 to Yang et al. and assigned to Xerox Corporation, is for a method and apparatus that allow an operator to monitor a digital printing system's output tray and enter fine-tuning commands through an electronic control. The operator can determine the effectiveness of his commands by watching how they affect the sheets that arrive at the output tray.

This technique is most effective when copies of only one page are being printed. When collated copies of multi-page documents are being produced, and the sheet or sheets of interest are covered by the top sheet, this technique loses its usefulness. In order to check the adjustments, the operator has to remove a completed compilation from the output tray, unwrap it (if it is shrink wrapped), and sort through the sheets to find the sheet or sheets of interest. If further corrections are needed then all the copies created in the meantime, have to be discarded or reworked. In either case, time and material are wasted.

An improvement is needed in digital production printing systems that allows print quality to be monitored in real-time.

The present invention is such an improvement. It allows a user to specify which parts of a job are critical, or representative of the job. The user can also indicate how often sample copies of each of those parts should be produced. The samples can be assessed, either by the user or a device. If a problem develops in the middle of a run, such as, poor registration, streaking or color drift, the operator will see it reflected in the samples and can pause the job and take corrective action and then resume the job. Alternatively a sensor can examine the samples and provide information to the machine to allow it to make automatic corrections to the process.

SUMMARY OF THE PRESENT INVENTION

One aspect of the present invention is a method for producing interrupting jobs during the production of a main job in an document processing apparatus. Such an apparatus usually comprises a plurality of machine modules that together process and/or produce printed media. The method comprises the steps of specifying a main job, where the main job comprises component parts and has at least one measure of progress; starting production of the main job; monitoring at least one measure of progress of the main job; specifying an interrupting job; interrupting the main job at a point when productivity is maintained and media is not wasted; producing the interrupting job, and; resuming the main job.

Another aspect of the present invention is a document processing apparatus comprising a plurality of machine modules in communication with each other for processing and/or producing printed media; at least one computing platform in communication with the plurality of machine modules for controlling and orchestrating the activities of the modules; a plurality of document collection points attached to at least one of the modules, and at least one of the plurality of document collection points designated, at least temporarily, as an interrupting job delivery point.

Another aspect of the invention allows for samples to be produced based on the number of copies produced in the main job.

Another aspect of the invention allows for samples to be produced based on main job run time.

Another aspect of the invention provides for the samples to be delivered at a convenient location apart from the main job delivery location.

Yet another aspect of the invention provides for high priority jobs to be requested instead of sample jobs.

One advantage of the present invention over the prior art is that it allows job quality to be monitored at a minimal cost.

Another advantage of the present invention is that it allows corrective action to be taken before large amounts of time and material are wasted due to poor print quality.

Yet another advantage of the present invention is that it allows a high priority job to interrupt a long print job with only minimal disruption to that job.

Still other advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PRESENT INVENTION

The present invention is for a digital printing system with an improved method for monitoring document quality. Samples of critical or representative parts of a main job are delivered, during main job production, to a location separate from where the main job documents are delivered. The operator can retrieve and examine these samples during job production and can immediately take corrective action if needed. Alternatively sensors can assess document quality and provide information for automatic system tuning.

Figure 1:
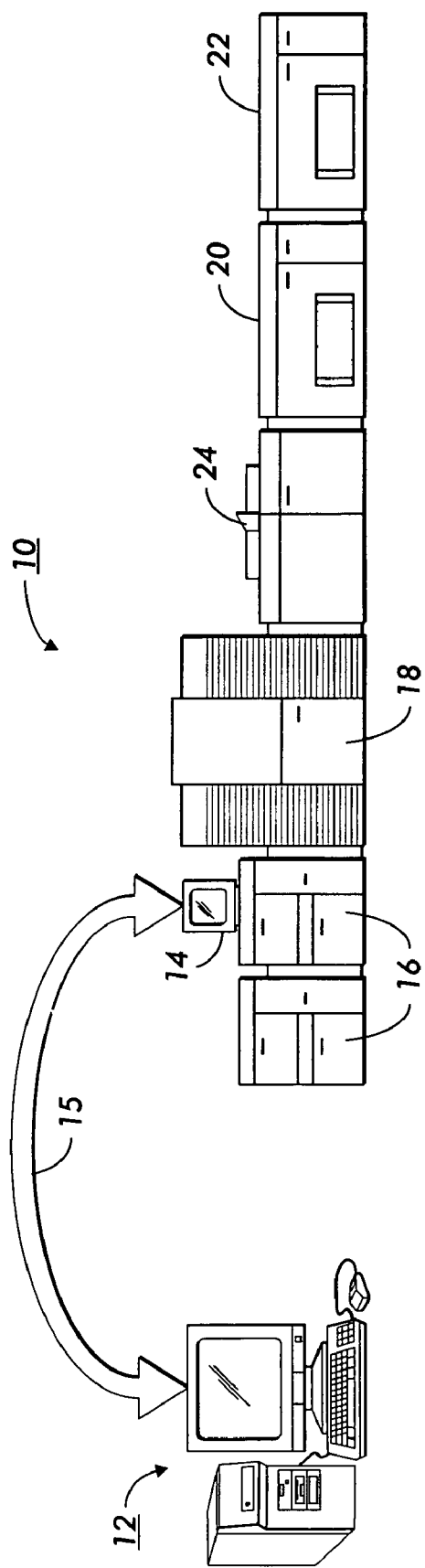
FIG. 1 shows a first digital production printing system comprising a first arrangement of modules in accord with the present invention.

Referring to FIG. 1, first digital printing system 10 comprises a number of removable and/or replaceable modules. Digital front end 12 is an operator interface and tie point for other devices such as document scanners and computer networks. The operator uses the digital front end 12 to enter information about print jobs. The information includes the source of images to be printed, the number of document copies required, the medium on which the document is to be printed, the type of binding to be used, etc. The digital front end then communicates this information, in the form of a job description, to a mark facility controller 14 via a communications path 15. The mark facility controller 14 controls the modules that comprise the digital printing system. It directs feeding devices 16 to deliver the appropriate size and type of paper or other media to a print engine 18 at the appropriate time. The mark facility controller 14 also coordinates the delivery of images to the print engine and directs it to print those images on the media delivered to it by feeding devices 16. It then orchestrates the delivery of printed pages to the appropriate finishing device. For example, a first finishing device 20 might be used to collate and bind a main job and a second finishing device 22 might be used to deliver sample pages. Alternatively, sample sheets might be delivered to a sample/purge tray 24.

Figure 2:
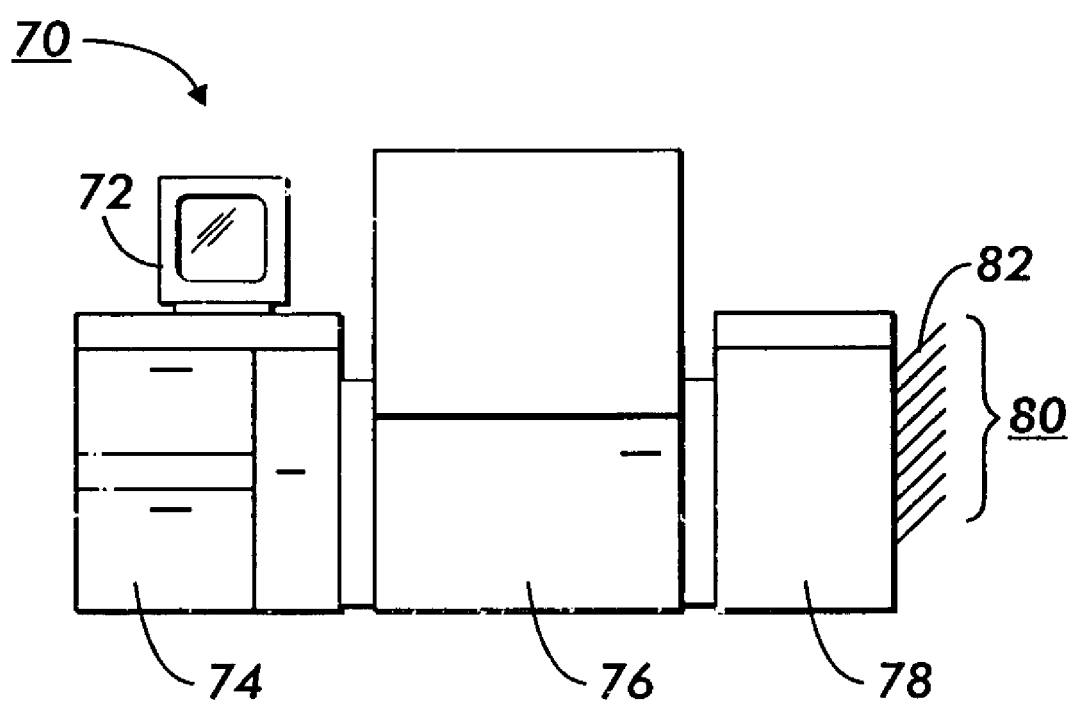
FIG. 2 shows a second digital production printing system comprising a second arrangement of modules in accord with the present invention.

Referring to FIG. 2, second digital printing system 70 includes a digital front end 72, a feeding device 74, a print engine 76 and a collator 78. The collator 78 assembles each document copy in one of a set of document trays 80. Configuration information designates one of the document trays 80 to be a sample or interrupting job output tray 82.

Digital printing systems 10 and 70 are just two examples of module configurations that can be used to practice the present invention and are not meant to limit the invention. Other configurations are possible. In some cases there may only be one computing platform visible. The computing platform might be a digital front end or it might carry out both the functions of a digital front end and a mark facility controller. In some cases the mark facility controller may be hidden from view. The mark facility controller might be installed in one of the modules, such as a print engine, that comprise the system. The digital front end function might be handled over a network. Therefore it is possible to build a system to practice the present invention that has no visible computing platform. Furthermore, systems can comprise multiple print engines and/or multiple feeding devices and/ or multiple finishing devices. It is even possible to practice the present invention with a system that does not include a print engine. One example of such a system is a signature booklet maker, which is familiar to those of ordinary skill in the art.

Figure 3:
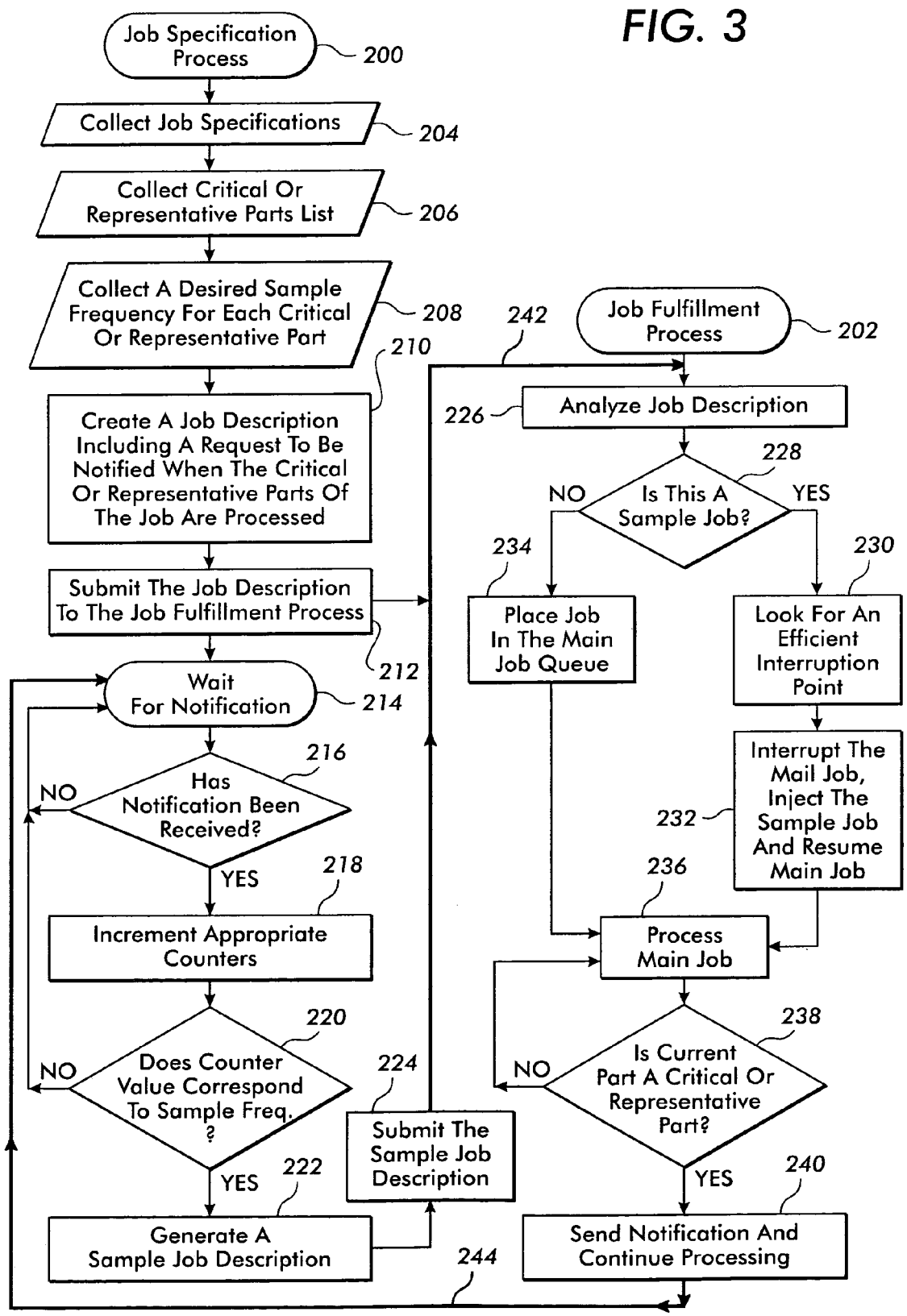
FIG. 3 is a flow diagram showing a first embodiment of the present invention.

A first embodiment of a method in accordance with the present invention is outlined in FIG. 3. For purposes of illustration, this embodiment has been broken down into two processes, a first job specification process 200 and a first job fulfillment process 202. First job specification process 200 might be run on a digital front end 12 while first job fulfillment process 202 might be run on a mark facility controller 14. However, both processes might also be run on a single computing platform or be further broken down and distributed as tasks for other devices or people to perform.

First job specification process 200 begins with a collection of job specifications 204. These specifications include the source for the images to be printed, the number of pages to be printed, which if any, are to be printed in color, which if any, are to be printed in high resolution, the size and kind of media on which they are to be printed etc. This information can be provided by the operator via means such as keyboard and/or mouse entry, or it can be provided electronically as a computer file or via a computer network connection.

The next step is a collection of a critical or representative parts list 206. This information is either provided electronically or it is provided by the operator after reviewing the job. It is a list of parts of sheets, sheets or compilations of sheets that require special attention, such as color pages or shrink wrapped compilations of sheets.

In addition, a collection of sample intervals for each critical or representative part is also made 208. The sample intervals indicate how often during the production of the main job, samples of each critical or representative part should be produced. For example a sample interval specification might be set so that a sample of a particular sheet is produced at a sample location, such as sample/purge tray 24 each time 25 copies of that sheet are produced at the main job location, such as first finishing device 20. Another part of the main job, less prone to error, might be sampled each time 100 copies are produced at the main job location.

Most of this information is compiled to create a main job description 210. The main job description includes the job specifications and the critical or representative parts list. The main job description is submitted 212 to the first job fulfillment process 202. In this embodiment the sample intervals are not submitted to the job fulfillment process but are kept for later use by the first job specification process 200.

At this point, the first job specification process 200 waits 214 to be notified that one of the listed critical or representative parts of the job is being processed. A counter is associated with each part in the list. When the first job specification process 200 receives 216 notification that one of the listed parts is being processed it increments 218 the appropriate counter. The value in that counter is tested 220 to see if it corresponds to the sample interval specified for the incident part. If it does, a sampled job description is generated 222, and then submitted 224 to the job fulfillment process 202, the counter is reset and the process waits 214 for the next notification.

A sample job description is similar to the main job description discussed above. It is however, different in that it is identified as a sample job request and that it is for a short run of a subset of the main job.

It should be noted that while this embodiment uses a count of produced documents to determine when it is time to produce samples, other measures of job progress are possible. One alternative measure of job progress is main job run time. Samples could be produced based on a time interval, every five minutes for example. It is intended that methods that use other measures of job progress are within the scope of the invention.

When the first job fulfillment process 202 receives a job description it analyzes 226 it. It determines whether or not 228 the job is a sampled job.

If it is a sample job, the first job fulfillment process 202 looks for an efficient interruption point in the main job 230, inserts 232 the sample job there, processes it, and then resumes main job processing.

If the job description does not call for a sample job, it is placed 234 on the main job queue. When it reaches the front of the queue it is processed 236. As it is processed, each part is examined 238 to determine whether it is on the critical or representative parts list. If it is, then notification of that fact is sent to first job specification process 200.

If both the first job specification process 200 and the first job fulfillment process 202 are carried out by one computing platform then communication paths 242 and 244 represent any technique used to transfer information between program functions, modules, objects or routines. If the processes are carried out on two or more computing platforms then communications paths 242 and 244 represent buses, networks, or other computer communications means.

Of course, this method can be repeated in whole or in part as many times as is required to successfully produce the main job or a series of main jobs.

Figure 4:
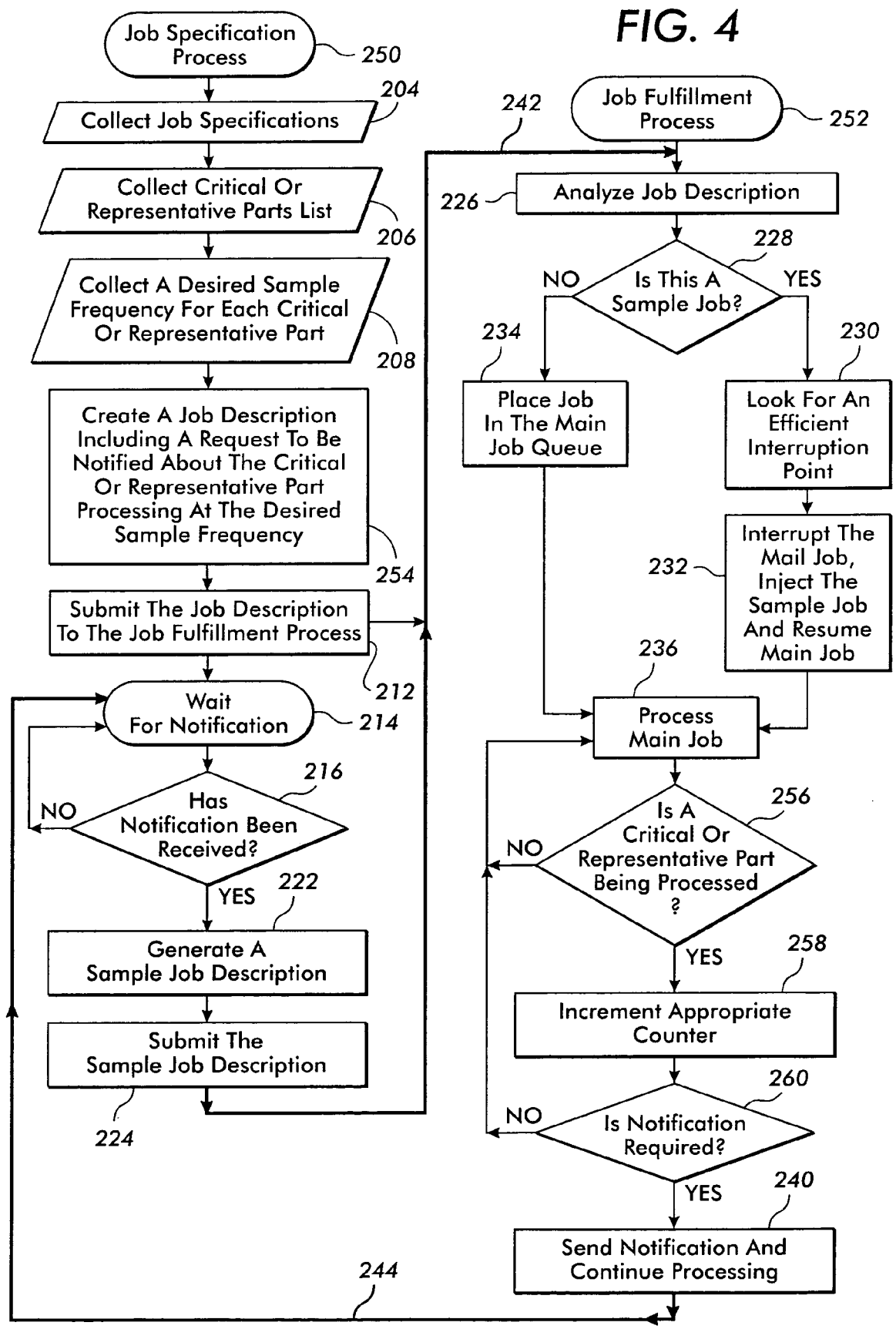
FIG. 4 is a flow diagram showing a second embodiment of the present invention.

A second embodiment of a method in accordance with the present invention is outlined in FIG. 4. As will be seen, it is similar to that shown in FIG. 3. Similar parts carry the reference designators introduced in FIG. 3.

Second job specification process 250 includes a step for collecting job specifications 204, a step for collecting 206 a critical or representative parts list and a step for collecting 208 a desired sample interval for each part just as first job specification process 200 does. It has a different job description creation step 254 however. In this embodiment a job description includes the desired critical or representative part sample interval information.

The job description is submitted 212 to a second job fulfillment process 252. In this embodiment, the second job specification process 250 does not keep track of the number of times each critical or representative part is processed. Instead that task is carried out by the second job fulfillment process 252.

When notification is received by the job specification process, it indicates that the incident part has been processed a number of times corresponding to the sample interval specification and a sample job description is generated 222 and submitted 224 to the second job fulfillment process 252.

It should be noted that while this embodiment uses a count of produced documents to determine when it is time to produce samples, other measures of job progress are possible and it is intended that methods that use such other methods are within the scope of the invention. For example main job run time could be measured and samples could be produced based on a time interval, every ten minutes for example.

When the second job fulfillment process 252 receives a job description it analyzes it 226.

If it is a sample job description the second job fulfillment process 252 looks 230 for an efficient interruption point in the main job, inserts the sample job there, processes it, and resumes processing 232 the main job.

If it is not a sample job, it is placed 234 on the main job queue. When it reaches the front of the queue, it is processed 236. As it is processed, each part is examined to determine 256 whether it is on the critical or representative parts list. If it is, then a counter associated with that part is incremented 258. The value of that counter is then checked 238 to see if it corresponds to the sample interval specification for the incident part. If it does, notification of that fact is sent to second job specification process 250, the counter is reset and processing continues.

Of course, this method can be repeated in whole or in part as many times as is required to successfully produce the main job or a series of main jobs.

Again, if both the second job specification process 250 and the second job fulfillment process 252 are carried out by one computing platform then communication paths 242 and 244 represent any of the techniques used to transfer information between program functions, modules, objects or routines. If the processes are carried out on two or more computing platforms then communications paths 242 and 244 represent buses, networks, or other computer communications means.

Figure 5:
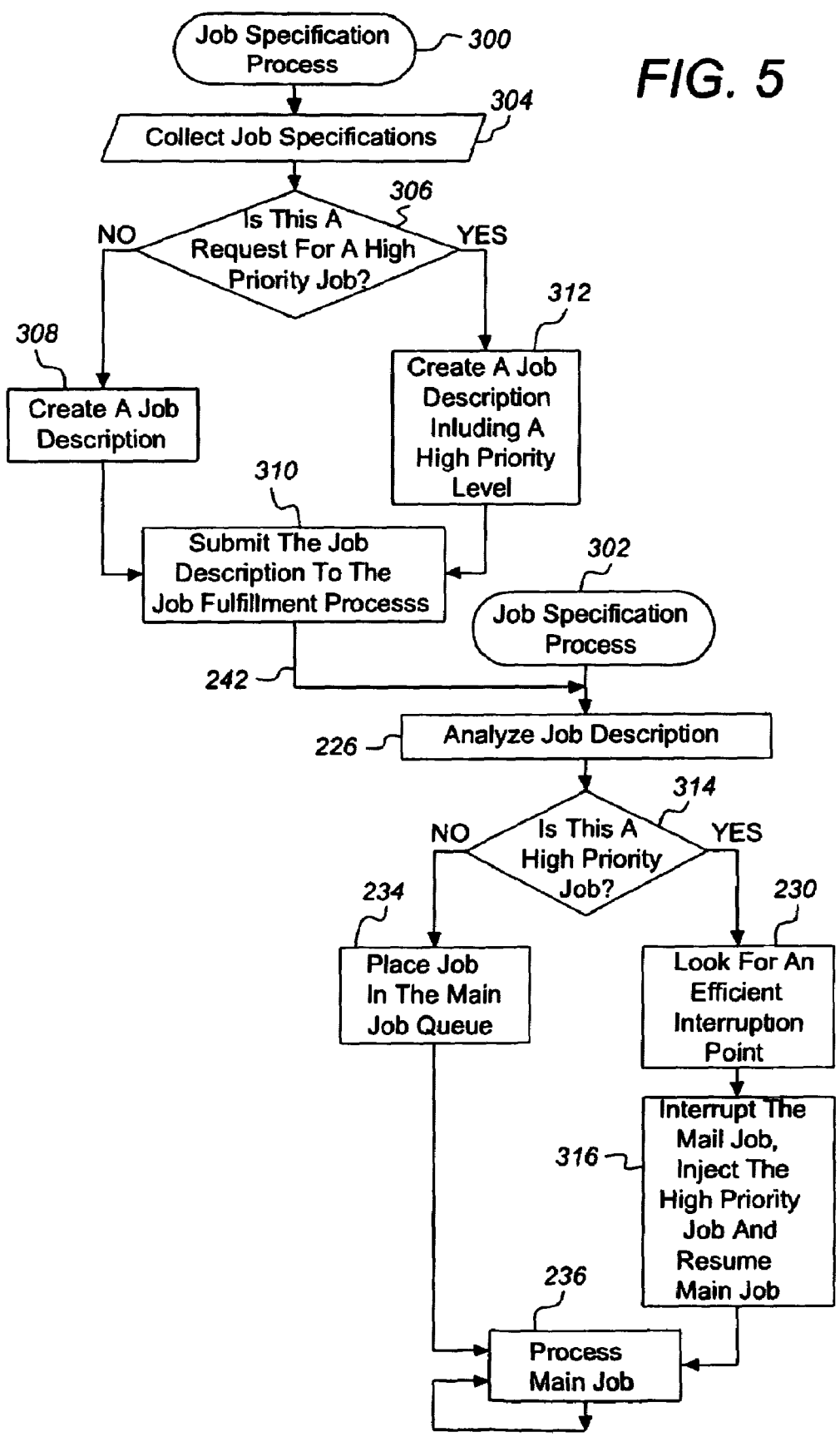
FIG. 5 is a flow diagram showing another aspect of the present invention.

The mechanisms created in order to accommodate sample job production also allow for other features to be incorporated into a digital printing system. Accordingly FIG. 5 depicts how those sample job producing mechanisms are used to interrupt a main job in order to produce a high priority job. For clarity, this method is shown separate from the first and second embodiments. However, this method can be incorporated in those embodiments, or others. Again, where steps are similar to steps previously introduced, they carry the reference designators of those previously introduced steps.

A third job specification process 300 and a third job fulfillment process 302 work together to produce a high priority job. In the third job specification process 300, a second job specifications step 304 is followed by a priority determination step 306. Second job specification step 304 includes gathering job priority information. Priority determining step 306 uses that information to determine which further processing path is appropriate.

If the job is of standard priority then a standard job description is created 308 and submitted to the third job fulfillment process 302. If the job has a high priority then a job description is created 312 including a high priority designation. The job specification is then submitted 302 to the third job fulfillment process 302.

When a job description is submitted to the job fulfillment process it is analyzed 226 and its priority is determined 314.

If it is of high priority, the third job fulfillment process looks 230 for an efficient interruption point in the main job and inserts 316 the high priority job there, processes it, and resumes main job processing.

If it is of normal priority it is placed in the main job queue 234. When it reaches the front of the queue, it is processed 236.

Of course, this method can be repeated in whole or in part as many times as is required to successfully produce the main job and high priority jobs or a series of main jobs and high priority jobs.

The invention has been described with reference to the preferred embodiment. Obviously, modifications and alterations will occur to others upon reading and understanding the preceding detailed description. It is intended that the invention be construed as including all such modifications and alterations insofar as they come with the scope of the appended claims or equivalents thereof.

What is claimed is:

1. In a document processing apparatus comprising a plurality of machine modules for processing and/or producing printed media, a method for producing interrupting jobs during the processing of a main job, the method comprising:

specifying the main job, the main job having at least one measure of progress;

starting production of the main job;

preselecting at least one respective representative part of the main job, thereby designating at least one respective sample job;

specifying at least one respective sample job production interval for the at least one respective representative part;

interrupting the main job at respective points when productivity is maintained and media is not wasted based on the at least one measure of progress and the specified at least one respective sample job production interval;

producing the at least one sample job, thereby generating at least one extra job element useful for examination or testing purposes, and;

resuming the main job.

2. The method of claim 1, wherein interrupting the main job comprises:

measuring an interval for each specified representative part;

determining if the specified sample job production interval has elapsed for any of the specified representative parts, and generating a sample job specification corresponding to any representative part for which the specified sample interval has elapsed.

3. The method of claim 2 wherein the interval is measured in the number of copies produced in the main job.

4. The method of claim 2 wherein the interval is measured main job run time.

5. The method of claim 1 wherein producing the sample job further comprises delivering the sample job at a convenient location apart from the main job delivery location.

6. In a document processing apparatus including a plurality of machine modules that process and/or produce printed media, a method for producing sample copies of specific parts of a document, the method comprising:

specifying a job;

predetermining which parts of the job are representative;

specifying a sample interval for each of the representative parts of the job;

producing the job;

measuring intervals for each of the specified representative parts and when a particular interval is reached;

generating an interrupting job description calling for the generation of a sample of the representative part of the job corresponding to the particular interval that was reached;

presenting the interrupting job description for processing;

analyzing the interrupting job description;

determining an efficient point in the job to produce the samples;

interrupting the main job at the efficient point;

processing the interrupting job description to produce the sample, thereby generating an extra job element useful for examination or testing purposes, and;

resuming the main job.

7. A document processing apparatus comprising:

a plurality of machine modules in communication with each other for processing and/or producing printed media;

at least one computing platform in communication with the plurality of machine modules for controlling and orchestrating the activities of the modules;

a plurality of document collection points attached to at least one of the modules; and, at least one of the plurality of document collection points designated, at least temporarily, as a sample job delivery point;

wherein the at least one computing platform is operative to receive a job specification, a predetermined representative part specification and a sample interval specification associated with the predetermined representative part specification and to control the plurality of machine modules to produce a job according to the received job specification and to produce samples according to the representative part specification at intervals determined by the sample interval specification.

8. The document processing apparatus of claim 7 wherein the at least one computing platform further comprises a digital front end and a mark facility controller in communication with each other.

9. The document processing apparatus of claim 7 wherein the plurality of machine modules comprises at least one feeder device and at least one finishing device.

10. The document processing apparatus of claim 7 wherein the plurality of machine modules comprises at least one print engine.

* * * * *